United States Patent [19]

Hartman

[11] Patent Number: 4,741,860

[45] Date of Patent: May 3, 1988

[54] ADHESION PROMOTERS CONTAINING OPTICAL BRIGHTENER

[75] Inventor: Marvis E. Hartman, Pittsburgh, Pa.

[73] Assignee: PPG Industries, Inc., Pittsburgh, Pa.

[21] Appl. No.: 914,434

[22] Filed: Oct. 2, 1986

[51] Int. Cl.[4] .................. C08K 5/34; C09K 11/06
[52] U.S. Cl. .................. 252/301.21; 252/301.19; 252/301.22; 252/301.23; 252/301.24; 252/301.27; 252/301.32; 252/301.35; 524/93; 524/94; 524/524; 524/583; 524/585
[58] Field of Search ............ 524/94, 93, 583, 585, 524/524; 252/301.19, 301.21, 301.22, 301.23, 301.24, 301.27, 301.32, 301.35

[56] References Cited

U.S. PATENT DOCUMENTS 3,991,255  11/1976  Blaskiewicz et al. .............. 428/425
4,611,016  9/1986  Hinsken ............................ 524/94
4,612,249  9/1986  Packer et al. .................. 428/424.8

OTHER PUBLICATIONS

Technical Report "Hardlen" (Chlorinated Poly-Propylene) of Toyo Kasei Kogyo Co., Ltd.

*Primary Examiner*—Herbert J. Lilling
*Attorney, Agent, or Firm*—William J. Uhl

[57] ABSTRACT

A composition comprising a chlorinated polyolefin and an optical brightener is disclosed. The compositions are useful as detectable adhesion promoters for polyolefin substrates. The compositions are applied as a coating to the polyolefin substrate and the coated substrate exposed to an ultraviolet light source to determine uniformity of the coating over the substrate. Uniform coverage is necessary to develop optimum adhesion between the substrate and a subsequently applied paint layer.

11 Claims, No Drawings

ADHESION PROMOTERS CONTAINING OPTICAL BRIGHTENER

BACKGROUND OF THE INVENTION

1. Field of the Invention

The present invention relates to compositions for use as adhesion promoters on polyolefin substrates and to a method of applying such compositions to the polyolefin substrate. More particularly, the present invention relates to compositions containing chlorinated polyolefins for use as adhesion promoters and to a method of applying such compositions to polyolefin substrates.

2. Brief Description of the Prior Art

Polyolefins such as ethylene and propylene as well as copolymers thereof are being used in increasing amounts in the fabrication of automobile bodies and trim such as front end fascia and filler panels located between the bumper and the chassis. These materials are light weight and have excellent impact resistance. They can withstand low speed collisions much better than metal counterparts. However, to be aesthetically acceptable, the polyolefin must be painted to match the paint on the rest of the automobile. Because of the low surface tension of polyolefins, it is very difficult to adhere paint directly to the surface of the polyolefin.

It is known in the industry that the adhesion of a paint layer to a polyolefin substrate can be improved if the substrate is first treated with an adhesion promoter. Typical adhesion promoters are solutions of chlorinated polyolefins which when applied as a coating to the polyolefin substrate act as a tie layer between the polyolefin and the subsequently applied paint. However, if the adhesion promoter is not applied uniformly to the polyolefin substrate, the adhesion of the subsequently applied coating will fail.

It is an object of the present invention to provide a detectable adhesion promoting composition, that is, one which when applied to the polyolefin substrate can be determined if it has been applied uniformly to the substrate.

SUMMARY OF THE INVENTION

In accordance with the present invention, a composition which when applied as a coating to a polyolefin substrate improves the adhesion of the polyolefin to other materials is provided. The composition comprises a chlorinated polyolefin and an optical brightener. When the applied coating is exposed to an ultraviolet (UV) light, the optical brightener fluoresces and it can readily be determined if the coating has been applied uniformly across the substrate.

The invention also provides for a method of treating the polyolefin substrate by applying to the polyolefin the composition described above, forming a substantially continuous film on the substrate and then exposing the coated substrate to an ultraviolet light source to detect the coverage of the composition over the substrate.

In practicing the method of the present invention, one can determine before a subsequent painting operation whether the adhesion promoter is uniformly distributed over the surface of the substrate. This will significantly reduce rejected parts caused by adhesion failure of the paint to the substrate resulting in a considerable savings of time, labor and money.

DETAILED DESCRIPTION

The essential components in the composition of the present invention are a chlorinated polyolefin and an optical brightener.

The chlorinated polyolefin may be a chlorinated copolymer of ethylene, propylene and copolymers thereof with homopolymers of polypropylene being preferred. Typically, the chlorine content of the chlorinated polyolefin will be about 15 to 75 percent by weight based on total weight of the monomer. The chlorinated polyolefins are available industrially as high chlorinated products, that is, 55 to 75 percent by weight chlorine, and as low as chlorinated products, that is, 15 to 50 percent by weight chlorine, with the low chlorinated products, particularly those of polypropylene, being preferred.

The chlorinated polyolefins are usually prepared by polymerizing the olefin or mixture of olefins in an inert organic diluent in the presence of a low pressure polymerization catalyst. After polymerization, the catalyst is deactivated and the resultant polyolefin reaction mixture is treated with a chlorinating agent to produce the chlorinated polyolefin product. Chlorinated polyolefins are available industrially from Eastman Kodak Company as CP-343-1 and CP-515-2 and from Toyo Kasei Kogyo Co., Ltd. under the trademark HARDLEN.

The chlorinated polyolefin is usually present in amounts of at least 10, preferably 20 to 80 percent by weight based on total solids weight of the composition. Amounts less than 10 percent by weight are undesirable because of insufficient adhesion promotion.

The optical brighteners are compounds that absorb ultraviolet light and convert the energy taken up into the longer wavelength visible portions of the spectrum. This is evidenced by a fluorescence. Any optical brightener can be used in the practice of the invention as long as it can be formulated along with the chlorinated polyolefin into a composition which can be applied to the polyolefin substrate as a substantially continuous film.

Typically, the optical brighteners are aromatic or heterocyclic compounds often with condensed ring structures and with an uninterrupted chain of conjugated double bonds. Examples of optical brighteners are derivatives of diaminostilbenedisulfonic acid such as the bistriazinyl derivatives, i.e., those compounds of the structure:

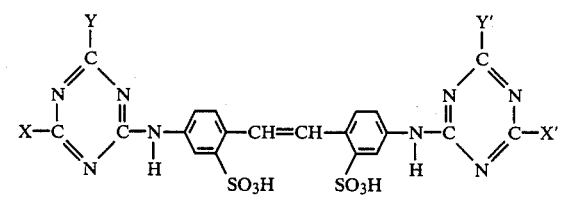

where X, X' and Y and Y' can be the same or different and include amino, substituted hydroxyl and chloro.

Examples of other optical brighteners are bisazoles such as those of the structure:

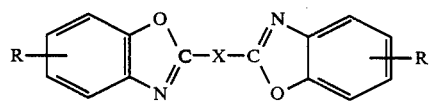

where R is hydrogen, alkyl and alkoxy and X is an unsaturated radical such as:

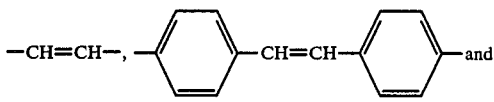

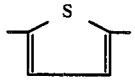

Bisazoles are preferred in the practice of the invention because of their intense fluorescence upon exposure to UV light, and the compound 2,2'-(2,5-thiophenediyl)-bis(5-tert-butylbenzoxazole), that is, R equals tertiarybutyl and X equals

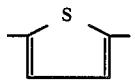

in the formula above, is especially preferred.

The optical brightener is preferably present in the composition in amounts of at least 0.1, usually 0.1 to 2.5 percent by weight based on total solids weight of the composition. Amounts less than 0.1 percent by weight do not provide sufficient fluorescence upon exposure to UV light. The upper limit of optical brightener is not known with certainty, however, amounts greater than 2.5 percent by weight offer no particular advantage and increase the cost of the composition. However, amounts greater than 2.5 percent can be used if desired.

The compositions of the present invention also contain an organic diluent to reduce the viscosity of the compositions and to make them suitable for coating applications. The organic diluent should be a material which will disperse or preferably dissolve the chlorinated polyolefin and optical brightener. Non-polar solvents such as aromatic hydrocarbons, halogenated hydrocarbons and cycloaliphatic hydrocarbons can be used and are preferred. Polar solvents such as alcohols, ketones and esters may be used if used in minor amounts with non-polar solvents but their use is not preferred. Examples of suitable solvents include toluene, xylene, methylene chloride and cyclohexane.

The organic solvent is usually present in the composition in amounts of about 50 to 98, preferably 70 to 95 percent by weight based on total weight of the composition. Amounts greater than 98 percent by weight are undesirable because of poor film build; whereas amounts less than 70 percent by weight result in a composition which is very viscous and hard to handle.

The composition can contain optional ingredients such as other resinous materials and pigments. Other resinous materials are often desirable to assist in the development of a continuous film and to provide for increased adhesion to the subsequent layer of paint. Examples of suitable adjuvant resins are vinyl acetate copolymers such as ethylene-vinyl acetate copolymers, alkyd resins, acrylic resins, and graft copolymers of vinyl monomers and alkyd resins. Vinyl acetate copolymer resins are preferred because in combination with chlorinated polyolefins, they provide a good combination of film-forming and adhesion-promoting properties. The co-resinous ingredients, if used, are preferably present in the compositions in amounts of up to 89, preferably 19 to 79 percent by weight based on total solids weight of the composition.

The compositions of the invention can optionally be pigmented which provides color and conductivity to the coating. Examples of suitable pigments include titanium dioxide and carbon black. When used, the pigments are typically used in a pigment-to-resin weight ratio of about 0.01 to 0.2:1.

As mentioned above, the compositions of the present invention are applied to polyolefin substrates, particularly those substrates used in the fabrication of automobile bodies and trim such as bumpers, front end fascia and filler panels which are located between the bumper and the chassis. Usually, these flexible parts are made from thermoplastic polyolefin resins which are made by polymerizing olefins such as ethylene and propylene including copolymers thereof. The polyolefins most often used in the fabrication of automobile body parts and trim are ethylenepropylene copolymers which also contain a small amount of a non-conjugated diene such as dicyclopentadiene. Typical polymers are those containing from 50 to 75 percent by weight ethylene, 25 to 45 percent by weight propylene and 2 to 8 percent by weight non-conjugated diene. These polymers are available industrially from Republic Substrates Co. and Research Polymers Co.

The compositions of the invention can be applied to the polyolefin substrate in any of the ways commonly used for applying coatings to substrates. The compositions can be applied by brushing, roll coating and spraying as long as a substantially continuous uniform film is formed on the substrate. Care should be taken that the correct amount of the composition is applied to the substrate. If the coating is too thick or too thin (non-uniform), adhesion failure of the substrate to the paint layer may result. Spraying is the preferred method of applying the composition to the substrate because it provides for the greatest control of coating thickness. Preferably, the coating thickness is controlled to levels of about 2 to 20 and more preferably from 3 to 15 microns. Air or airless spraying can be used.

After the coating has been applied to the substrate, it is usually given an air flash to permit the solvents to volatilize. Preferably, the coating is then given an exposure to intense UV light such as from a medium pressure mercury arc lamp. Such lamps emit radiation over the range of 220 to 1400 nanometers; emitting principally at 254, 313 and 365 nanometers. Exposure of this sort is not for the purpose of detecting coverage but seems to improve the adhesion promoting characteristics of the coating. Exposure need not be long but is usually at least 5 seconds, typically 5 seconds to 2 minutes.

The coated substrate is then exposed to UV light in the near, that is, about 360–370 nanometers, UV visible wavelength region to detect the uniformity of the coverage of the composition over the substrate.

Light from this source, i.e., black light, is absorbed by the optical brightener and converted to energy in the visible portion of the spectrum where it appears as a fluorescence.

By exposure of the coated substrate to the black UV light source and the resultant fluorescence, one can readily see whether the composition has been applied uniformly across the surface of the substrate. If different portions of the substrate fluoresce with different intensities or do not fluoresce at all, then the composition has not been applied uniformly and adhesion of the substrate to the layer of paint is uncertain. The polyolefin substrate can then be cleaned, recoated with the composition and evaluated again. Cleaning is easily accomplished by treating the coated substrate with an aromatic solvent. This is preferable to painting the substrate and finding out that the adhesion is unacceptable. The paint must then be stripped from the substrate or the painted part scrapped, both of which are costly.

The layer of paint which is applied to the primed substrate described above is typically an elastomeric paint which is industrially available from many companies supplying the automotive industry. A typical paint is that provided by PPG Industries, Inc. under the trademark DURETHANE. Specific paint products are DURETHANE 700 and DURETHANE 800. The paint is typically cured at a temperature of 70°-120° C. for 15 to 40 minutes.

The present invention will be more fully understood from the following illustrated examples wherein all quantities, percentages and ratios are on a weight basis unless otherwise indicated.

EXAMPLES

A coating composition containing a chlorinated polyolefin and an optical brightener was prepared by first preparing a pigment paste followed by incorporation of the optical brightener into the pigment paste. The pigment paste was prepared from the following mixture of ingredients:

| Ingredient | Parts by Weight (in grams) |
| --- | --- |
| V + P Naphtha | 41.20 |
| Cyclohexane | 32.96 |
| Toluene | 90.64 |
| ELVAX 260[1] | 20 |
| Chlorinated polyolefin[2] | 20 |
| TiO$_2$ | 1.2 |

[1]Ethylene-vinyl acetate copolymer available from E. I. duPont de Nemours and Company.
[2]Chlorinated polypropylene (25 percent chlorine) available from Eastman Kodak Company as CP 343-1.

The V+P naphtha, cyclohexane and toluene were mixed together and heated to about 50° C. The ELVAX 260 and CP 343-1 were first dissolved in the heated solvent mixture followed by the addition of the TiO$_2$. The mixture was then ground in a Zircoa mill to a Hegman No. 7 grind.

The optical brightener was incorporated into this pigment paste to form a sprayable coating composition as follows:

| Ingredient | Parts by Weight (in grams) |
| --- | --- |
| Pigment paste | 206 |
| Optical brightener[1] | 2 |
| Cyclohexane | 309 |
| Toluene | 309 |

[1]UVITEX OB available from Ciba-Geigy used as a 5 percent by weight solution in toluene.

The ingredients were mixed together in the order indicated with low shear mixing to form the coating composition containing 0.1 percent optical brightener based on weight of total solids.

The coating composition was sprayed onto a thermoplastic polyolefin substrate (ETA 3131 available from Republic Substrates) to form a substantially continuous film having a thickness of about 10 microns. The film was then given an air flash at ambient temperature and then directly exposed to black UV light which showed a uniform fluorescence over the surface of the substrate indicating uniform coverage of the chlorinated polyolefin.

When the substrate was topcoated with a coating composition available from PPG Industries, Inc. as DURETHANE 700 and heated at 120° C. for 30 minutes, excellent adhesion of the topcoat to the substrate was obtained.

Additional compositions of the adhesion promoters were prepared as generally described above but with the exception that the compositions contained 0.5, 1.5 and 2.5 percent by weight optical brighteners. In each instance, it was found that when the adhesion promoting compositions were spray applied in a uniform manner over the thermoplastic polyolefin substrate (as evidenced by a uniform fluorescence when exposed to black UV light), excellent adhesion of the subsequently applied topcoat (DURETHANE 700) was obtained. In each instance, the film thickness was about 10 microns.

A further experiment was conducted with a coating composition as generally described above containing 0.1 percent by weight optical brightener but in which the adhesion promoting composition was applied in a non-uniform manner to the thermoplastic polyolefin substrate. The composition was applied heavily in one area and lightly in another. Film thickness varied from 0 to 10 microns across the substrate. Upon exposure of the coated substrate to black UV light, a non-uniform fluorescence resulted. Application and curing of the topcoat DURETHANE 700 as generally described above resulted in very poor adhesion of the topcoat to the substrate.

The above examples show that the adhesion promoting compositions containing a chlorinated polyolefin and the optical brighteners of the present invention provide a convenient way to determine whether the adhesion promoter is evenly distributed over a substrate, thereby insuring for good adhesion of the subsequently applied topcoat to the substrate.

I claim:

1. A coating composition which when applied as a coating to a polyolefin substrate improves the adhesion of the polyolefin to other materials and which is readily detectable by ultraviolet light, comprising:
   (A) 20 to 80 percent by weight based on total solids weight of the composition of a chlorinated polyolefin and
   (B) at least 0.1 percent by weight based on total solids weight of the composition of an optical brightener and
   (C) 50 to 98 percent by weight based on total weight of the composition of an organic solvent.

2. The composition of claim 1 in which the optical brightener is present in the composition in amounts of about 0.1 to 2.5 percent by weight based on total solids weight of the composition.

3. The composition of claim 1 in which the chlorinated polyolefin is a chlorinated polypropylene.

4. The composition of claim 1 in which the chlorinated polyolefin contains from 15 to 50 percent chlorine.

5. The composition of claim 1 in which the optical brightener is a bisazole.

6. The composition of claim 5 in which the bisazole is of the structure:

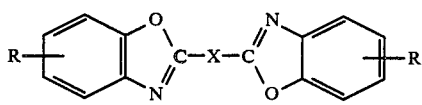

where R is hydrogen, alkyl and alkoxy and X is an unsaturated radical.

7. The composition of claim 6 wherein X is

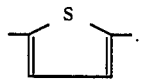

8. The composition of claim 1 which also contains a resinous material different from the chlorinated polyolefin.

9. The composition of claim 8 in which the resinous material is a vinyl acetate copolymer.

10. The composition of claim 9 in which the resinous material is an ethylene-vinyl acetate copolymer.

11. The composition of claim 9 in which the vinyl acetate copolymer is present in the composition in amounts up to 89 percent by weight based on total solids weight of the composition.

* * * * *